Nov. 23, 1926.
J. M. DUNLEA
INCLINOMETER
Filed Jan. 30, 1920
1,607,881
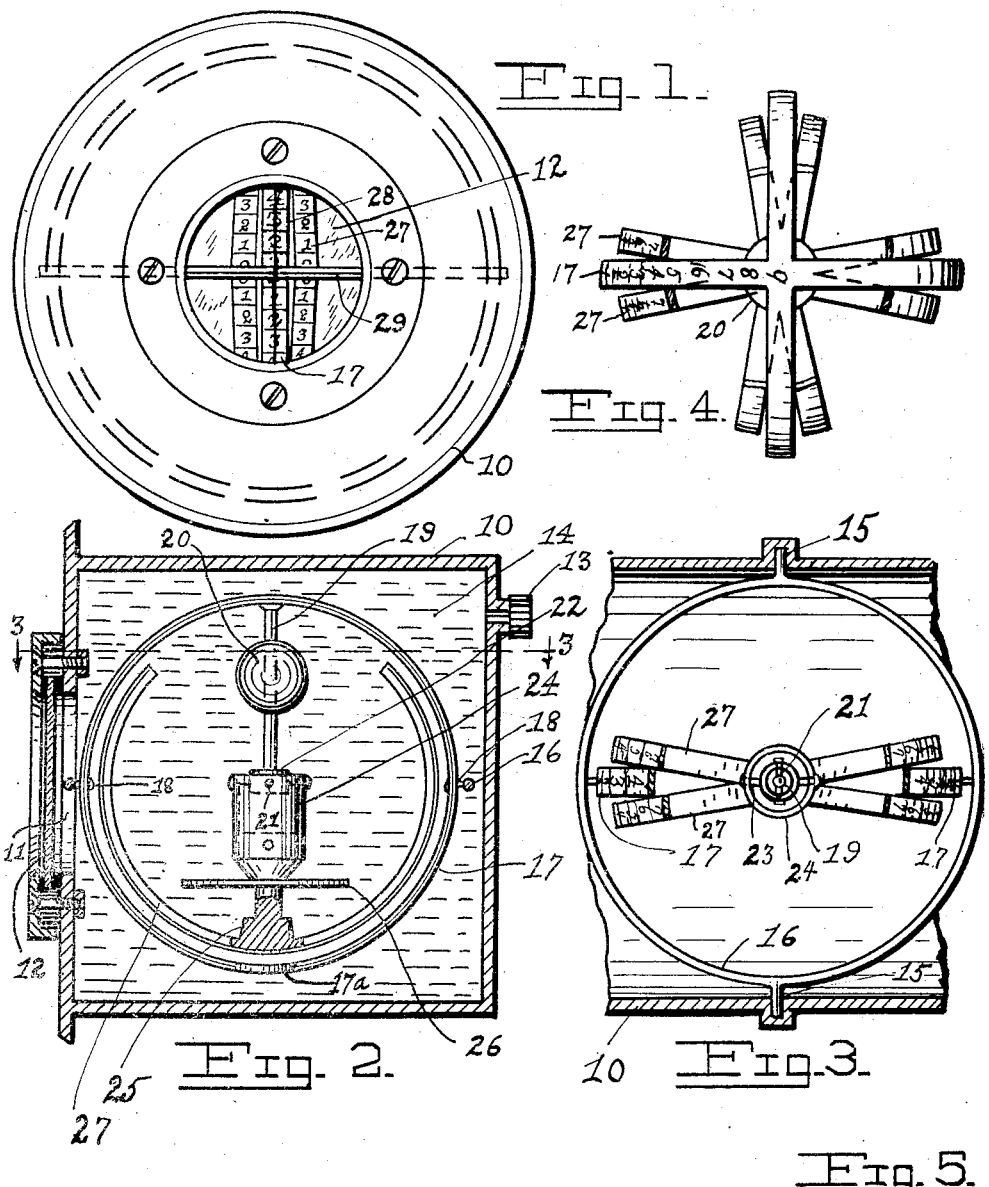

Patented Nov. 23, 1926.

1,607,881

UNITED STATES PATENT OFFICE.

JOHN M. DUNLEA, OF LOS ANGELES, CALIFORNIA, ASSIGNOR OF ONE-TWENTIETH TO WILLIAM WEINSTEIN, OF LOS ANGELES, CALIFORNIA.

INCLINOMETER.

Application filed January 30, 1920. Serial No. 355,138.

My invention is an instrument primarily designed for use on aeroplanes, and adapted to accurately indicate either fore and aft or lateral tilt; and also arranged to indicate acceleration and retardation, as well as curvature in the line of flight, of the aeroplane.

Inclinometers have been heretofore constructed which include a support arranged to tilt with the aeroplane, and a pendulum designed to maintain a perpendicular position, so that the relative movement between the support and pendulum would show approximately the tilt of the aeroplane.

Such devices are inaccurate however, since the acceleration or retardation accompanying fore and aft tilt of the aeroplane, has caused variation in the relative movement of the support and pendulum, due to the inertia of the latter; and similarly, variations in the relative position of the support and pendulum have occurred during lateral tilt of the machine, due to the movement of the pendulum through the centrifugal force produced by the turning movement of the aeroplane, which turning movement is incident to a lateral tilt of the machine.

As a result, the relative position of the support and its pendulum has not given a true indication of the tilt of the aeroplane.

In order to overcome the above difficulties, I provide a device comprising essentially a support fixed for tilting movement with the aeroplane, and two members supported thereby so that the support is free for independent movement relative to the respective members. The members are in turn arranged, so as to tend to different degrees, to maintain perpendicular positions, and as a result, acceleration or retardation of the machine, and also centrifugal force produced by turning movement during lateral tilt, will shift the respective members to different degrees, so that the difference in the position of the support with respect to the two members, will give an accurate basis for determining the true tilt of the aeroplane.

The difference in the positions of the two members with relation to the support, also indicates acceleration or retardation of the machine, and turning of the same.

In the practical embodiment of the invention set forth,

Fig. 1 is a front elevation of the device.

Fig. 2 is a vertical longitudinal section, partly broken away.

Fig. 3 is a section on the line 3—3 of Fig. 2.

Fig. 4 is a top plan view of the pendulums.

The supporting element of the device, which is fixed relative to the aeroplane, is shown as a casing 10, having front opening 11 provided with a transparent plate 12. A filling port having closure cap 13 is also provided in the casing, and through this port the casing is preferably filled with a liquid 14, which is non-freezing and not too mobile, as for example, a mixture of alcohol and glycerine.

A ring 16 is mounted in the casing by trunnions 15, so that its axis is in a normally horizontal transverse plane, and an annular band 17 is journaled in ring 16 by means of trunnions 18, so that its axis is in a normally horizontal longitudinal plane relative to the casing. The bottom of band 17 is weighted as shown at 17ª, and the band thus forms a pendulum having its pivot at the centers of ring 16 and band 17, and adapted to maintain a perpendicular position irrespective of fore and aft or lateral tilt of casing 10 with the aeroplane.

A perpendicular rod 19 depends from the top of band 17, and may have a buoyant ball 20 fixed thereon. At the end of rod 19 a universal joint is formed between the same and a depending sleeve 24, said joint having its center concentric with the pivot of pendulum band 17, and comprising a pivot pin extending transversely through rod 19, with a ring 22 journaled thereon, and having longitudinally extending trunnions 23 forming a pivotal support for the sleeve 24.

The lower end of sleeve 24 is weighted as shown at 25, so that it forms a pendulum which will tend to maintain a perpendicular position irrespective of both fore and aft and lateral tilt of casing 10 and the aeroplane to which the casing is fixed.

Arcuate bands 27 extend upwardly from weight 25, both front and rear, and preferably at the respective sides of band 17, the space between the upper ends of the front and rear bands providing for movement of the inner pendulum formed by weighted sleeve 24, independent of the outer pendulum formed by band 17, without the liability of bands 27 striking rod 19.

The outer pendulum, comprising band 17, is so weighted as to move relative to the liquid within the casing, without said liquid affecting the movement of the pendulum to any extent, and said freedom of movement is enhanced by the buoyant effect of ball 20. The inner pendulum, on the other hand, is of lighter weight, so that its movement relative to the liquid will be controlled to an appreciable extent by the latter, and said control may be increased by providing a retarding disc 26 upon sleeve 24.

The bands 17 and 27 are preferably provided with scales both front and rear, and graduated upwardly and downwardly from zero; and when the aeroplane upon which the device is mounted, is flying without fore and aft or lateral tilt, so that casing 10 is upright, the zeros of scales 17 and 27 will coincide with a horizontal center line 29 provided at opening 11, and the scale bands will also be parallel to the vertical center line 28 extending across the sight opening of the casing.

When the aeroplane and casing fixed thereto, tilt fore and aft, and if there is no acceleration or retardation, the two pendulums maintain a perpendicular position, so that either upper or lower coinciding scale markings of bands 17—27 appear opposite the horizontal center line of opening 11, thereby registering the degree of tilt of the machine by said graduations, and also denoting the absence of acceleration or retardation, through the coincidence of the scale markings of the two bands 17—27.

Normally, however, a fore and aft tilt will be accompanied by either acceleration or retardation of the machine, so that the pendulums will tend to swing either rearwardly or forwardly from the perpendicular, and therefore not accurately register the degree of tilt. But since the outer pendulum is arranged for greater freedom of movement than the inner pendulum, as previously described, the pendulums will swing to different degrees, so that the difference between their scale markings with relation to the horizontal center line of the sight opening of casing 10, will indicate acceleration or retardation as well as tilt, and will also form a basis for readily computing the amount of acceleration or retardation and tilt, the calibration of the instrument being predetermined.

In similar manner, in the case of lateral tilt unaccompanied by turning movement of the aeroplane, the scale bands 17—27 will assume an equi-angular position with relation to the vertical center line 28 of the sight opening 11. The instrument will thus accurately show the angle of lateral tilt, and will also denote the absence of turning movement of the aeroplane by the parallelism of the bands.

In the normal case, however, since banking of the aeroplane will cause turning movement thereof, the pendulums will tend to swing laterally through centrifugal force, and here again the difference in the degree of swing of the respective pendulums, due to the difference in their freedom of movement and tendency to remain perpendicular, will cause a difference in the relative angular positions of the two bands 17—27 to the vertical center line 28, so that said angular difference will indicate both turning movement and lateral tilt.

It will thus be seen that I have provided a simple but efficient and accurate instrument for showing not only fore and aft and lateral tilt of an aeroplane, but also acceleration and retardation thereof, as well as turning movement when banking.

It will also be noted that the arrangement of the graduated bands with scale marking on both the front and rear portions of the same, together with the construction of the pivotal mountings for the pendulums, permits of bands 17—27 being seen through the sight opening of the casing, even though the aeroplane may pass through involved lines of flight.

The specific construction which has been described is but one practical embodiment of the device, and it will be readily apparent that various changes in the construction, arrangement, and combination of parts, may be made without departing from the scope of the invention.

What is claimed is:

1. A device of the character described comprising a support, pendulum members having free pivotal suspension from said support so as to assume perpendicular positions, one of said members being adapted for substantially free swinging movement beyond the perpendicular in response to accelerated or retarded movement of said support, and the other of said members having means for partially retarding free swinging movement thereof relative to the first member and beyond the perpendicular in response to accelerated or retarded movement of the support, whereby an angular difference is created between said members during acceleration or retardation of said support, said angular difference varying in accordance with said accelerated or retarded movement, and cooperating means for said members for indicating said angular difference.

2. A device of the character described comprising a casing adapted to receive a liquid, members pivoted in said casing so as to assume perpendicular positions, one of said members being adapted for free swinging movement through the liquid beyond the perpendicular in response to accelerated or retarded movement of the casing, and the other of said members having means adapted to be impinged by the liquid for partially retarding free swinging movement of said member relative to the first member and beyond the perpendicular in response to accelerated or retarded movement of the casing, whereby an angle will be formed between the members during acceleration or retardation of the casing, said angle varying in accordance with said accelerated or retarded movement, and scale markings cooperating with both of said members for indicating said angular difference.

3. A device of the character described comprising a casing adapted to receive a liquid, weighted members pivoted in the casing so as to assume perpendicular positions, a buoyant element in said liquid upon one of the members above its pivot to permit free swinging movement of said member beyond the perpendicular in response to accelerated or retarded movement of the casing, the other of said members having means for partially retarding free swinging movement thereof relative to the first member and beyond the perpendicular in response to accelerated or retarded movement of the casing, whereby an angle will be formed between the members during acceleration or retardation of the casing, said angle varying in accordance with said accelerated or retarded movement, and cooperating means for said members indicating said angular difference.

4. A device of the character described comprising a support, an annulus pivoted therein and having a transverse normally horizontal axis, a second annulus journaled in said first annulus and having a longitudinal normally horizontal axis, said second annulus being weighted at one side of its axis so as to form a pendulum, a universal joint supported by said pendulum annulus at the intersection of said axes, and a second pendulum suspended from said universal joint within said pendulum annulus, one of said pendulums being adapted for substantially free swinging movement beyond the perpendicular in response to accelerated or retarded movement of the support, and the other of said pendulums having means for partially retarding free swinging movement thereof relative to the first pendulum and beyond the perpendicular in response to accelerated or retarded movement of the support, whereby an angular difference is created between said pendulums during acceleration or retardation of the support, said angular difference varying in accordance with said accelerated or retarded movement.

5. A device of the character described comprising a support, an annulus pivoted therein and having a transverse normally horizontal axis, a second annulus journaled in said first annulus and having a longitudinal normally horizontal axis, said second annulus being weighted at one side of its axis so as to form a pendulum, a rod extending inwardly connected to the upper portion of said pendulum annulus, a universal joint carried by said rod at the intersection of said axes, a second pendulum suspended from said universal joint within said pendulum annulus, an arcuate band fixed to said second pendulum and lying parallel to said pendulum annulus when the pendulums are perpendicular, a vertical and horizontal sight line on said support cooperating with said arcuate band and said pendulum annulus, and cooperating graduations on said arcuate band and said pendulum annulus, one of said pendulums being adapted for substantially free swinging movement beyond the perpendicular in response to accelerated or retarded movement of the support, and the other of said pendulums having means for partially retarding free swinging movement thereof relative to the first pendulum and beyond the perpendicular in response to accelerated or retarded movement of the support, whereby the graduations of said arcuate band and said pendulum annulus will be moved different distances relative to the horizontal sight line of the support and said arcuate band and pendulum annulus will form different angles relative to said vertical sight line of the support during accelerated or retarded movement of the support.

6. A device of the character described comprising a support, an annulus pivoted therein on normally horizontal transverse and longitudinal axes, said annulus being weighted at one side of its axes so as to form a pendulum, a universal joint supported by said pendulum annulus, a pendulum suspended from said universal joint within the pendulum annulus, one of said pendulums being adapted for substantially free swinging movement beyond the perpendicular in response to accelerated or retarded movement of the support, and the other of said pendulums having means for partially retarding free swinging movement thereof relative to the first pendulum and beyond the perpendicular in response to accelerated or retarded movement of the support, whereby an angular difference is created between said pendulums during acceleration or retardation of the support, said angular difference varying in accordance with said accelerated or retarded movement, and cooperating means on said pendulums for indicating said angular difference.

7. A device of the character described comprising a support, an annulus pivoted therein on normally horizontal transverse and longitudinal axes, said annulus being weighted at one side of its axes so as to form a pendulum, a universal joint supported by said pendulum annulus at the intersection of said axes, a pendulum suspended from said universal joint within said pendulum annulus, an arcuate band fixed to said second pendulum and lying parallel to the pendulum annulus when the pendulums are perpendicular, and cooperating graduations for said arcuate band and said pendulum annulus, one of said pendulums being adapted for substantially free swinging movement beyond the perpendicular in response to accelerated or retarded movement of the support, and the other of said pendulums having means for partially retarding free swinging movement thereof relative to the first pendulum and beyond the perpendicular in response to accelerated or retarded movement of the support, whereby the arcuate band and the pendulum annulus will be moved different distances in a longitudinal plane and will form an angular difference in a transverse plane during accelerated or retarded movement of the support.

8. A device of the character described comprising two members pivoted on axial bearings and each weighted at one side of its pivotal axis so as to form a pendulum assuming a perpendicular position with minimum frictional resistance at its pivotal bearing, one of said pendulums being adapted for substantially free swinging movement beyond the perpendicular in response to accelerated or retarded movement of the device, and the other of said pendulums having means for partially retarding free swinging movement thereof relative to the first pendulum and beyond the perpendicular in response to accelerated or retarded movement of the device, whereby an angular difference is created between the pendulums during acceleration or retardation of the device, said angular difference varying in accordance with said acceleration or retardation, and cooperating means for said members indicating said angular difference.

9. A device of the character described comprising a support, members universally pivoted to the support so as to assume perpendicular positions, the universal bearings of said members each having a fixed relation to the support, one of the members being adapted for substantially free swinging movement beyond the perpendicular in response to accelerated or retarded movement of the support, and the other of the members having means for partially retarding free swinging movement relative to the first member and beyond the perpendicular in response to accelerated or retarded movement of the support so as to create an angular difference between the members during acceleration or retardation of the support, said angular difference varying in accordance with said acceleration or retardation, and cooperating means for said members indicating said angular difference.

In witness that I claim the foregoing I have hereunto subscribed my name this 23rd day of January 1920.

J. M. DUNLEA.